(12) United States Patent
Smulders et al.

(10) Patent No.: US 8,263,164 B2
(45) Date of Patent: Sep. 11, 2012

(54) HEAT STABLE NUTRITIONAL BEVERAGE AND METHOD OF PREPARING IT

(75) Inventors: Pauline Elisabeth Antoinette Smulders, Zoelen (NL); Marco Albertus Franciscus Johannes Somers, Tilburg (NL)

(73) Assignee: Campina Nederland Holding B.V., Zaltbommel (NL)

( * ) Notice: Subject to any disclaimer, the term of this patent is extended or adjusted under 35 U.S.C. 154(b) by 198 days.

(21) Appl. No.: 12/669,773

(22) PCT Filed: Jul. 9, 2008

(86) PCT No.: PCT/NL2008/050464
§ 371 (c)(1),
(2), (4) Date: Jan. 19, 2010

(87) PCT Pub. No.: WO2009/011573
PCT Pub. Date: Jan. 22, 2009

(65) Prior Publication Data
US 2010/0196559 A1 Aug. 5, 2010

(30) Foreign Application Priority Data

Jul. 18, 2007 (EP) .................................... 07112686
Mar. 27, 2008 (EP) .................................... 08153405

(51) Int. Cl.
*A23C 17/00* (2006.01)
(52) U.S. Cl. ......... 426/583; 426/522; 426/590; 426/658
(58) Field of Classification Search ................... 426/583, 426/522, 590, 658
See application file for complete search history.

(56) References Cited

U.S. PATENT DOCUMENTS

| | | | |
|---|---|---|---|
| 5,641,531 A | 6/1997 | Liebrecht et al. | |
| 6,139,901 A * | 10/2000 | Blazey et al. | 426/656 |
| 2005/0003054 A1* | 1/2005 | McCampbell | 426/321 |
| 2006/0003073 A1 | 1/2006 | Etzel et al. | |

FOREIGN PATENT DOCUMENTS

| | | |
|---|---|---|
| DE | 41 13 836 A1 | 1/1992 |
| EP | 1 314 361 A | 5/2003 |
| JP | 02-303457 A | 12/1990 |
| WO | WO-2006/119064 A2 | 11/2006 |

OTHER PUBLICATIONS

Kulmyrzaev A et al: "Influence of sucrose 1-9,17 on the thermal denaturation, gelation, and emulsion stabilization of whey proteins." Journal of Agricultural and Food Chemistry, vol. 48, No. 5, 2000, pp. 1593-1597.
International Search Report corresponding to PCT/NL2008/050464, dated Oct. 21, 2008, 2 pages.
International Preliminary Report on Patentability corresponding to PCT/NL2008/050464, dated Nov. 19, 2009, 5 pages.
Boye, "Thermal denaturation of mixtures of alpha-lactalbumin and Beta-lacto-globulin," Food Research International, vol. 33, 2000, pp. 673-682.
Dagin et al., "The rate of protein digestion affects protein gain differently during aging in humans," J. Physiol, vol. 549.2, 2003, pp. 635-644.
Frid et al, "Effect of whey on blood glucose nd insulin responses to composite breakfast and lunch meals in type 2 diabetic subjects," Am. J. Clin. Nutr., vol. 82, 2005, pp. 69-75.
Markus et al., "The bovine protein alpha-lactalbumin increases the plasma ratio of tryptophan to the other large neutral amino acids, and in vulnerable subjects raises brain serotonin activity, reduces cortisol concentration, and improves mood under stress," Am. J. Clin. Nutr., vol. 71, No. 6, 2000, pp. 1536-1544.
Micke et al., "Effects of long-term supplementation with whey proteins on plasma glutathione levels of HIV-infected patients," Eur. J. Nutr., vol. 41, No. 1, 2002, pp. 12-18.
Paddon-Jones et al., "Differential stimulation of muscle protein synthesis in elderly humans following isocaloric ingestion of amino acids or whey protein," Exp. Gerontol., vol. 41, No. 2, 2006, pp. 215-219.

* cited by examiner

*Primary Examiner* — Helen F Heggestad
(74) *Attorney, Agent, or Firm* — Gilberto M. Villacorta; Sunit Talapatra; Foley & Lardner LLP

(57) ABSTRACT

A heat stable nutritional beverage having a pH of 6.6-8.2 comprising 5-12% w/w whey protein is obtained by incorporating 4-16% w/w of at least one sugar selected from di-oligo- and polysaccharides, wherein at least one monosaccharide is other than glucose.

19 Claims, No Drawings

HEAT STABLE NUTRITIONAL BEVERAGE AND METHOD OF PREPARING IT

CROSS-REFERENCE TO RELATED APPLICATIONS

This application is a National Stage application of PCT/NL2008/050464, filed Jul. 9, 2008, which claims the benefit and priority of European Patent Application No. 07112686.6, filed Jul. 18, 2007 and European Patent Application No. 08153405.9, filed Mar. 27, 2008. The foregoing applications are incorporated by reference herein in their entirety.

The invention relates to a heat stable, whey-containing nutritional beverage and to a method of preparing such a beverage.

BACKGROUND

A heat stable, whey-containing nutritional beverage is known from WO 2006/119064, which describes a novel aseptic beverage and pudding comprising at least 2% whey, and a process for manufacture thereof.

There is presently an increasing demand for high-protein preparations as beverages, especially those with low carbohydrate contents. More particularly, this demand encompasses beverages having high levels of whey protein. Whey protein is considered an excellent source of protein for medical nutrition because of its easy digestion ("fast protein") and its favourable amino acid composition. Whey protein has an excellent amino acid score of 1.2, contains a high amount of essential amino acids (590 mg/g), comprising among others 480 mg/g branched chain amino acids (leucine, valine and isoleucine) and 26 mg/g tryptophan. The cysteine content is higher than in most other food proteins (32 mg/g). The efficacy of whey protein in improving protein synthesis in elderly subjects was shown in several clinical studies [M. Dangin et al., *J. Physiol* 549 (Pt 2): 635-644, 2003, D. Paddon-Jones et al., *Exp. Gerontol.* 41 (2):215-219, 2006.]. Indications exist that whey protein improves insulin response in type II diabetics after carbohydrate ingestion [A. H. Enid et al., *Am. J. Clin. Nutr.* 82 (1): 69-75, 2005].

Due to its high cysteine content, whey protein may positively influence the plasma level of glutathione in subjects exposed to severe oxidative stress, which was shown in patients with advanced HIV infection [P. Micke, K. M. et al., *Eur. J. Nutr.* 41 (1): 12-18, 2000]. Glutathione is a crucial endogenous antioxidant, radical scavenger and detoxicant, the metabolism of which is compromised at many clinical and sub-clinical conditions and at higher age. The favourable tryptophan/LNAA (large neutral amino acids) ratio of whey protein is supposed to positively affect the brain serotonin level in stress-prone subjects [C. R. Markus et al., *American Journal of Clinical Nutrition* 71 (6):1536-1544, 2000]. Whey protein is also appreciated in bodybuilding and it is very popular in both weight loss nutrition and sports nutrition. In addition to containing whey protein, high-protein beverages often contain many vitamins and minerals. In contrast to whey-containing products for healthy people, which are often formulated as refreshing drinks with a low pH, products used for medical nutrition usually require a final product pH in the neutral range and heat treatment. At neutral pH, whey proteins are not heat-stable.

Therefore existing shelf-stable liquid products that contain whey proteins usually contain only a very small quantity of this highly nutritional protein, because of the seemingly insurmountable problems caused by the whey proteins during a conventional sterilisation manufacturing process.

In order to obtain a long shelf life of beverages of 12 months or longer, sterilisation is the preferred heat treatment, in particular as a so-called UHT treatment. Typically in the UHT process, the product is indirectly heated to 135° C.-140° C. by means of heating coils, and held at this temperature for 6-10 seconds, or heated directly by live steam under pressure at 140° C.-150° C. for 2-4 seconds, followed by aseptic packaging. Such a process allows an extension of shelf life to 12 months or more, though at the cost of some change in organoleptic properties. A further possibility is the so-called retort process, wherein the product is completely sterilised by sealing in cans which are then heated in an autoclave at 110° C.-130° C. for 10-20 minutes. However, as will be evident to the skilled artisan, the retort process can cause heat damage to, or even destroy, sensitive ingredients and may result in unacceptable organoleptic and physical changes.

This is especially a major problem for beverages containing whey protein, more particular at whey protein concentrations of over 2% w/w at neutral pH. Because of the high temperatures involved in sterilisation processes (either UHT or batch), the whey-containing beverages tend to lose consistency, and protein may sediment out in the form of lumps or aggregates at the bottom of the container. A further problem is that the exposure of the proteins to heat may also cause gelation, resulting in increased viscosity such that beverages become almost pudding-like in consistency. Furthermore, the presence of more than about 2% whey protein in a beverage results in a short shelf life and unsatisfactory organoleptic properties characterised by unpalatable taste, gelation, sedimentation and grittiness or powdery texture in beverages.

In the case of liquid medical food preparations, the risk of microbial contamination needs to be eliminated. Such beverages need to be subjected to thermal sterilisation processes in order to eliminate possible pathogens. However, as explained above, this severe thermal treatment has a negative effect on the organoleptic and physical quality of the liquid preparation in case high amounts of thermally sensitive proteins such as whey proteins are present.

As explained before, there is a need for a heat stable, nutritional beverage having a high content of whey proteins with a shelf life of at least 12 months.

In the art, no satisfactory solutions have so far been brought forward. WO 06/119064 proposes to use a specific homogenisation process to solve the severe problem of aggregation of the whey proteins, but this is only partially successful as the highest whey protein concentration disclosed is 4.1% w/w.

Boye and Alli (*Thermal denaturation of mixtures of α-lactalbumin and β-lacto-globulin: A differential scanning calorimetric study, Food Research International* 33 (2000), 673-682) describe heat treatments of (mixtures of) 2 purified whey proteins at very high protein concentration (40 wt. %) in the presence of a high sugar concentration (20 wt. %), and there is no relation to a beverage.

DESCRIPTION OF THE INVENTION

It has now been found that the use of specific sugars render the beverages heat-stable at high whey protein levels, of more than 2% w/w.

The invention therefore relates to a heat-stable nutritional beverage comprising 5-12% whey protein w/w and a sugar component selected from galactose-containing and/or fructose-containing di-, oligo- and polysaccharides, and having a pH of 6.6-8.2.

Throughout the description, the term "heat-stable" is defined as a liquid state in which essentially no gelation, sedimentation or aggregation is observed in the beverage, either directly after heat treatment or after prolonged storage at temperatures of about 20° C., e.g. at least 6, preferably at least 12 months.

The term "beverage" relates to any water-based liquid which can be ingested as a drink, e.g. by pouring, sipping or tube-feeding. Although other liquid components, such as alcohols, may be present, e.g. in a concentration up to 2 wt. %, their presence is not preferred, and the remaining liquid is preferably essentially water.

Whey proteins as used herein are understood to comprise any protein present in or derived from whey, including beta-lactoglobulin, alpha-lactalbumin, serum albumin and immunoglobulins, and any combinations thereof in any ratio. The whey and whey proteins may be derived from any mammals, including ruminants, in particular cattle, buffalo, horse, sheep and goat, preferably cattle (bovine whey).

The whey protein concentration in the beverage comprises a range from 5.0 to 12.0% w/w, especially 6.0-10.0% w/w, preferably 7.0-9.0% w/w, and most preferably 7.5-8.5% w/w.

The whey protein in the beverage may comprise a whey protein concentrate, (WPC), preferably WPC 60 or higher (60% whey protein on total solids), even more preferably a WPC 80 or higher, as this leads to an effective whey protein level in the drink with a minimum of non-protein components. The whey protein may also comprise whey protein isolate (WPI, having 90% or more protein on total solids). The whey protein, WPC or WPI may be derived from any type of whey, e.g. cheese whey, acid whey, lactic whey, cottage cheese whey.

In a most preferred embodiment, the whey protein comprises a WPC or WPI derived from acid casein production, since this type of WPC has a very favourable essential amino acid profile.

Suitable commercially available whey protein concentrates are Textrion Progel 800 or Esprion 800 from DMV International, The Netherlands, or Whey Protein Concentrate type 80 from Golden Cheese Company, USA, or Oragel HG 80 (Armor, France).

It is preferred that the whey protein concentrates or isolates are depleted in calcium ions, i.e. have a calcium content of less than 0.4% on dry weight. A high calcium content in the whey protein concentrates or isolates may still cause aggregation in the beverage. Preferably, the calcium content in the beverages is less then 0.04 wt. % (less than 40 mg per 100 ml (10 mM), most preferably between 2 and 20 mg per 100 ml (0.5-5 mM), and especially between 2.4 and 10 mg per 100 ml (0.6-2.5 mM)). In addition, it is preferred that the content of all divalent and possibly higher-valent cations (including calcium, magnesium, zinc, iron, aluminium, etc.) is less than 25 mM, more preferably between 0.5 and 15, most preferably between 0.75 and 4 mM.

It is furthermore preferred that the salt level in the beverage in general is relatively low, in order to prevent undesired gelation. In particular, the salt concentration, expressed as ionic strength, is less than 100 mM, more in particular less than 80, especially less than 60 mM, most preferably less than 50 mM. It is noted that then ionic strength $I_c$ is defined by the formula $I_c = \frac{1}{2}\Sigma c_i \cdot z_i^2$, wherein $c_i$ and $z_i$ are the concentration and the charge, respectively, of the individual ions. Thus, for a salt of two monovalent ions such as NaCl, the ionic strength is the same as the molar concentration, whereas for a salt of a monovalent ion and a divalent ion such as $CaCl_2$ or $(NH_4)_2SO_4$, it is three times the molar concentration and for a salt of two divalent ions such as $MgSO_4$, it is four times the molar concentration. For practical reasons, a minimum ionic strength of 5, especially 10 mM will apply. Proteins and amino acids are not included in the calculation of the ionic strength.

The whey protein in the beverage may be an integral part of another protein, such as a milk protein isolate or a milk protein concentrate.

Other proteins, e.g. milk proteins, may be included in the drink but are not necessary. Should these be added, it is preferred to use milk protein concentrates of milk protein isolates. It is preferred that the amount of non-whey proteins, such as casein, is less than 50% (w/w), preferably less than 33% (w/w) of the amount of whey protein. The absolute level of non-whey protein of the beverage is preferably less than 5% w/w, more preferably less than 3% w/w, e.g. between 0.5 and 2.5% w/w.

Optionally, hydrolysed whey proteins may be included in the beverage. This has an advantage in that hydrolysed whey proteins are less prone to gel formation and/or aggregation than intact whey protein. With the addition of hydrolysed whey protein, the nutritional beneficial profile of the beverage can be enhanced even further. Therefore, in an embodiment, the whey protein comprises hydrolysed whey protein. In a preferred embodiment, the whey protein comprises from 10-90% wt. hydrolysed whey protein, preferably 20-80 wt. %. A very suitable range is 30-70 wt %. The degree of hydrolysis (DH) of the hydrolysed whey protein is preferably between 5 and 30%, more preferably between 10 and 20%.

Suitable whey protein hydrolysates comprise LE80GT (DH=17%), LE80GF (DH=18%), WE80FT and WE80BG (DH=29%) from DMV International, the Netherlands.

The sugar component to be used according to the invention can be selected from any di-, oligo- and polysaccharides, especially from di-, oligo- and polysaccharides wherein at least one monosaccharide residue is other than glucose, such as fructose, galactose, mannose, xylose, arabinose, etc. The di-, oligo- and polysaccharides preferably contain no more than one glucose unit. The sugar In particular, the sugar component is selected from di-, oligo- and polysaccharides having the formula:

wherein Gal, Glc and Fru are (anhydro-) galactose, glucose and fructose residues, respectively, which may have any relative position, and $m=0-10$, $n=0$ or 1, and $p=0-200$, provided that $m+n+p=$ at least 2.

Preferably $m=1-5$ or $p=1-60$, more preferably 1-20, most preferably 2-10.

Examples of sugar components that can be used according to the invention include saccharose and isomaltulose ($n=1$, $p=1$), lactose ($m=1$, $n=1$), galactosyl-fructose (e.g. galsucrose) ($m=1$, $p=1$), raffinose and lactosucrose ($m=1$, $n=1$, $p=1$), stachyose ($m=2$, $n=1$, $p=1$), galacto-oligosaccharides ($m=2$ to about 5, $n=0$ or 1), inulobiose ($p=2$), kestose ($n=1$, $p=2$), fructo-oligosaccharides (FOS) ($n=0$ or 1, $p=2$ to about 20) and fructopolysaccharides ($n=0$ or 1, $p=$about 20 to about 200). Mannosucrose, xylsucrose and the like can also suitably be used.

Preferred sugar components are saccharose, lactose, galacto-oligosaccharides, fructo-oligosaccharides, and fructo-polysaccharides. When low-energy beverages are desired, the preferred sugar components are galacto-oligosaccharides, fructo-oligo-saccharides, and fructo-polysaccharides, in particular fructo-oligosaccharides having a DP (degree of polymerisation) of 3-20. Mixtures of these sugar components are equally suitable.

Sugars are preferably at least one selected from the group consisting of saccharose, lactose and fructans. These sugars have been shown to be particular effective in protecting the whey protein from gelling, coagulation etc. during the sterilisation process.

The concentration of the sugar component is at least 2% w/w, preferably at least 4.0% w/w. A suitable concentration range of the sugar is 6.0-15.0% w/w on the ready-for-use beverage. Lower concentrations do not work effectively for all whey protein ranges and higher concentrations are not practical because of the total high solids content of the beverage. Preferred is a range of 7.0-13 w/w %, more preferred 8-10% w/w sugars.

In various separate embodiments, the sugars comprise
- a mixture of a fructan, lactose and saccharose; or
- a mixture of inulin or FOS and lactose and/or saccharose or
- a mixture of lactose and saccharose.

By combining the sugars from the above embodiments, a tailor-made heat-stable beverage can be obtained for a wide range of whey proteins. A particularly suitable mixture comprises saccharose and fructo-oligosaccharides (FOS) wherein at least 80% (by weight) of the FOS molecules have a DP from 3 to 10.

In another preferred embodiment, the level of reducing sugars of the sugar component is below 40%, more preferably below 20%, most preferably below 10% of the total weight of the sugar component to be used according to the invention (w/w). Non-reducing sugars of the sugar component include saccharose, galsucrose, manno-sucrose, lactosucrose, raffinose, stachyose and, especially, fructans.

In a preferred embodiment, the beverage is a low caloric beverage comprising less than 2.5 wt. %, especially less than 1 wt. % digestible sugars. Digestible and hence caloric sugars are sugars which are used in the art as sweetener and are e.g. saccharose, glucose, fructose, lactose, galactose, maltose and have a caloric value of more than 3.0 kcal/gram, contrary to non-digestible sugars like fructans, which have a caloric value of less then 2.0 kcal/gram. In this embodiment, the preferred sugar is consequently a fructan.

In a more preferred embodiment, the fructan comprises inulin or fructo-oligo-saccharides (FOS, or also called oligofructose). Suitable fructans commercially available are oligofructose Beneo® P95 (Orafti, The Netherlands) and inulin Beneo® LGI (Orafti, The Netherlands), which is a low caloric sugar inulin; furthermore Frutalose® (an oligofructose) and Frutafit® (an inulin) from Sensus, the Netherlands are suitable.

The fructans, in particular inulin, preferably have a degree of polymerisation (DP) of 2-200; preferably between 3 and 60. Preferably oligofructose has a DP of 2-10, more preferably 3-10. The fructan may also be present as a mixture of inulin and oligofructose.

It is furthermore preferred that the fructan, inulin and/or oligofructose contains less than 7.0% w/w, more preferably less than 4.0% w/w free reducing mono-saccharides (glucose, fructose) to minimise Maillard (browning) reactions.

Description of Fructan

Inulin and oligofructose (other possible names of oligofructose: FOS, fructo-oligosaccharides) belong to the group of fructans, which are linear and branched polymers of fructose, widely found in nature. Fructans are, after starch, the most abundant non-structural natural polysaccharides. Inulin and oligofructose occur naturally in significant amounts in common vegetables and cereals.

Inulin is a mixture of poly- and oligosaccharides which almost all have the chemical structure $GF_n$ in which G=glucose, F=fructose and n=number of fructosyl (fructose residues) molecules linked by a β(2-1) bond. Generally, inulins are polymers mainly comprised of fructose units and typically have a terminal glucose. Plant inulins generally contain between 2 to 140 fructose units. The simplest type of inulin is kestose, which has 2 fructose units and 1 glucose unit. The degree of polymerisation of inulin is variable: it is a function of many factors such as source from which it was extracted, the climate and growing conditions, the harvesting time and storage conditions.

To clarify, the degree of polymerisation is the number of repeating units in an average polymer chain at time t in a polymerisation reaction. The length is in monomer units and it is a measure of molecular weight:

$$DP=MW/MW_0,$$

where MW=molecular weight of the polymer t; $MW_0$=molecular weight of one monomeric unit (repeating unit of (anhydro)fructose).

However, inulin typically ranges from 3 to 60 degree of polymerisation. The Figure below illustrates the structure of inulin:

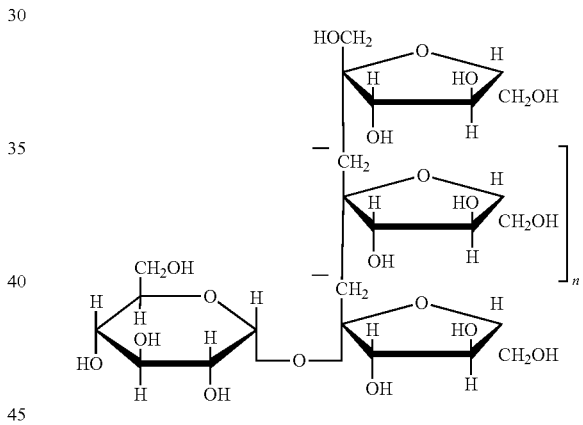

Chemical structure of inulin; n=any number (fructose units)

Oligofructose is a common name for fructooligosaccharides. Oligofructose belongs to a subgroup of inulin as was already mentioned before. Its chemical composition is $F_n$ or $GF_n$ indicating n fructose units linked by β(2-1) linkages. Their DP can go up to 10 or 20. Oligofructose is obtained commercially by enzymatic hydrolysis from inulin. Most of the time it is a mixture of $GF_n$ and $F_n$ molecules where the F/G ratio may differ between 3 and 40. Another type of oligofructose (or fructo-oligo-saccharide) is the type $GF_n$ (n=about 1-5) obtained by enzymatic trans-fructosylation from sucrose (saccharose), commercially available e.g. as Actilight® from Beghin Meiji.

Table 1 gives an overview of a number of inulin/oligofructose compositions:

TABLE 1

| Substance | Basic structure | DP range | Average DP | DP < 10 (%) | DP < 20 (%) | F/G ratio |
|---|---|---|---|---|---|---|
| Inulin/Oligofructose composition | | | | | | |
| Oligofructose | $GF_n$ | 3-10 | ±4 | 100 | 100 | 3-40 |
| | $F_n$ | 2-10 | | 100 | 100 | |
| Inulin | | | | | | |
| Chicory | $GF_n$ | 3-60 | ±10 | ±30 | 55 | ±9 |
| Topinambour | | 3-50 | ±6 | 50 | 75 | ±5 |
| Onion | | 3-12 | ±4 | 100 | 100 | ±3 |
| Artichoke | | 3-200 | ±40 | <2 | <5 | ±40 |
| As in Raftuline ® ST | | 3-60 | ±10 | 30 | 55 | ±9 |
| As in Raftiline ® HP | | 6-60 | ±25 | ±10 | ±45 | ±25 |
| As Frutalose ® 60 | | 3-60 | ±10 | — | — | — |
| As Frutafit ® TEX! | | 6-60 | ±23 | — | — | — |

All components with formula $GF_n$ and $F_n$ are called inulin (also the short chains with n up to 10). However, generally the short chain inulin is called: oligofructose. To make it clear, all oligofructoses (of the β-2-1 type) are inulins, but not all inulins are oligofructose.

In a most preferred embodiment, the fructan is oligofructose, as this gives an equally good performance with respect to heat stability across various types of whey protein concentrates.

Instead of, or in addition to the fructans of the inulin type (β-2-1 linked), also fructans of the levan type (β-2-6 linked) are suitable according to the invention. Also, galactans (β-linked or α-linked galacto-oligosaccharides) can suitably be used.

In addition to the stabilising sugar components defined above, the beverage may contain further carbohydrates. These may include digestible carbohydrates such as glucose, maltose, and maltodextrins, e.g. if a meal-replacing nutritional beverage is desired, but also non-digestible carbohydrates such as soluble fibres, e.g. derived from soy, etc. Preferably, the level of such other carbohydrates is not more than 5% w/w, more preferably less than 3% w/w, most preferably less than 1% w/w, of the beverage. The level of reducing monosaccharides, such as glucose, galactose etc., is preferably below 2 wt. %, more preferably below 1 wt. %, of the beverage.

The pH of the beverage can be at least 6.6, preferably 6.8 or higher, up to about 8.2. A higher pH leads to off-taste and protein degradation, a lower pH causes protein aggregation. More preferably, the pH is 7.0-8.0, most preferably 7.2-7.8.

The shelf stability at a temperature of about 20° C. of the heat-treated beverage was found to be at least 6 months, preferably at least 12 months.

Preferably the viscosity of the beverage is 50 mPa·s or lower. Most preferred is a viscosity of 20 mPa·s or lower. Higher viscosities than 50 mPa·s render the drink unpalatable.

Optionally, the beverage contains food grade fat, e.g. canola oil and/or MCT (medium chain triglycerides), preferably in an amount of 2-10 wt. %. Preferably these fats contain a substantial proportion, e.g. at least 40%, preferably at least 60% of unsaturated, most preferably poly-unsaturated fatty acids. Most preferred the drink is in emulsified form.

The beverage according to the invention may further comprise at least one additional nutritional ingredient, like minerals, vitamins, trace elements selected from the table 2 below. The minerals, vitamins, trace elements are preferably present at a level between 0.25 times and 5 times, especially between 0.5 and 2.5 times the recommended daily intake per liter.

TABLE 2

| | |
|---|---|
| Sodium | Vitamin A |
| Potassium | Vitamin C |
| Calcium | Thiamin |
| Iron | Riboflavin |
| Phosphorus | Niacin |
| Iodine | Vitamin $B_6$ |
| Magnesium | Folic Acid |
| Zinc | Vitamin $B_{12}$ |
| Copper | Vitamin D |
| Chloride | Vitamin E |
| Manganese | Biotin |
| Selenium | Pantothenic Acid |
| Chromium | Vitamin $K_1$ |
| Molybdenum | L-Carnitine |
| | Taurine |
| | Choline |

The beverage may further include protein hydrolysates other than from whey, antioxidants, amino acids, colouring agents, flavours, artificial (non-caloric) sweeteners, thickeners, stabilisers, emulsifiers, etc. A preferred stabiliser to enhance mouth feel of the beverage is selected from anionic polysaccharides, in particular carrageenan, e.g. Genulacta K100 (Kelco), which can be used in a concentration of 0.005-0.2 wt %., preferably 0.01-0.1 wt %, and most preferably 0.02-0.05 wt %.

Such beverage formulations can suitably be used in medical food applications, e.g. in disease-specific nutritional beverages that require a high whey protein level but should also comply with certain fat, carbohydrate and vitamin/mineral specifications.

The invention further relates to a method of preparing a heat-stable whey-containing nutritional beverage comprising the steps of a) providing a sugar solution, b) adding whey protein to a final concentration of 5-12% w/w, c) adjusting the pH to 6.6-8.2, d) heating the beverage so obtained at a temperature of at least 80° C., e) cooling the beverage, wherein the sugar in step a) is a di-, oligo- and polysaccharide as defined above, especially having the formula $Gal_m$-$Glc_n$-$Fru_p$ as defined above, and is present in an amount of at least 4, up to 15% w/w in the beverage. The preferred sugar and the whey protein and the optional further components to be used in the method of the invention are as described above.

In the method of preparing the beverage, steps a), b) and c) may be interchanged or combined, provided that the final concentrations of whey proteins and sugars are between the indicated ranges in steps a) and b), and the final pH is preferably between 6.8 and 8.0, before step d) is executed.

Although heat stability can be achieved using lactose and/or saccharose, these sugars are less suitable for low-caloric beverages, e.g. in diet- or slimming beverages, or for individuals having lactose intolerance or diabetes. Therefore, in a preferred embodiment, the sugar from step a) is a low caloric sugar having a caloric value of less than 2 kcal/g. In this embodiment, the sugar is preferably a fructan having a caloric value of less than 2 kcal/g.

Other proteins, e.g. other milk proteins besides whey proteins, may be included in the method but are not necessary. Should these be added it is preferred to use milk protein concentrates (MPC) or milk protein isolates (MPI), e.g. MPI ReCaP from DMV International, the Netherlands.

The pH of the solution may be adjusted between 6.6 and 8.0, the outer values included, using food grade acids, e.g. HCl, $H_3PO_4$, $H_2SO_4$, citric acid, lactic acid or mixtures thereof; or using bases, e.g. NaOH, KOH, $NH_4OH$ or mixtures thereof. $Ca(OH)_2$ is not preferred as it enhances protein aggregation during heat treatment. Preferably the pH is adjusted to 7.0-8.0; most preferably 7.2-7.8.

Heating the solution may be carried out using UHT equipment, after which it can optionally be cooled prior to aseptic filling in containers; alternatively, the heat treatment may be carried out in a batch or retort process wherein containers are filled with the beverage prior to the heat treatment.

In a preferred embodiment, the heating in step d) of at least 80° C. comprises a UHT step, or a batch heat treatment.

In a preferred embodiment, a UHT step comprises heating between 135-150° C. for 2-35 seconds, and the batch heat treatment comprises heating at 80-100° C. for 5-30 minutes.

The heat treatment typically results in the whey proteins being denatured.

The optional fat may be incorporated in the beverage using a homogenisation step. Preferably, the fat addition and homogenisation in the process is executed before step d).

The viscosity of the solution can be adjusted to any desired value, but preferably less than 50 mPa·s, more preferably less than 20 mPa·s using suitable thickeners well-known by the skilled person.

The invention further relates to a container which may comprise a bottle, can or pouch containing a heat stable nutritional beverage having a pH of 6.8-8.0 comprising 5-12% w/w whey protein and at least one sugar components as defined above in an amount of 6-15% w/w. Such containers can conveniently be supplied to consumers, medical professionals or hospitals in need for nutritional, high whey protein containing beverages having a prolonged shelf life of at least 12 months. The content of these containers may be adjusted to the recommended daily intake of whey protein. Suitable container sizes are e.g. 100 ml, 150 ml, 250 ml and 500 ml.

EXAMPLES

Preparation Process of the Beverage

First, the sugar was dissolved in tap water. For 8% (w/w), 12.8 g sugar was dissolved in 147.2 g water in order to obtain a final amount of 160 g. Then, the whey protein powder (e.g. WPC 80) was allowed to dissolve in the sugar solution for at least 30 minutes on a magnet stirrer. The pH of the solution was determined and adjusted to pH of 7.5 (using 1M NaOH or 1M HCl). Subsequently the solution was divided over several plastic jars. These jars were then placed in a water bad of 93° C. and were heated for 5 minutes at a temperature of above 90° C. The temperature was checked by placing a temperature probe in a similar jar with 30 ml of water. During heating the jars were gently shaken. After heating the samples were rapidly cooled to ambient temperature with ice. After a few minutes the samples were placed up side down, assessed for the presence of aggregates, gel formation or lumps, and a picture was taken. After one day the viscosity measurement and turbidity were performed, and the same assessments was performed as above.

During 6 months to 1 year of ambient temperature storage, the same analyses were executed as after one day and it appeared that all beverages according to the invention did not show gel, gel lumps or aggregates and had remained viscous.

Rheology Measurement

In order to determine the viscosity of the beverages, rheology measurement was performed. The measurement was performed using Modular Compact Rheometer (MCR300, Paar Physica, Germany) with a concentric cylinder having a diameter of 27 mm. 20 g of the solution were poured into the cylinder. The temperature control was done by using a Viscotherm VT2 Temperature Thermostat from Anton Paar. The temperature of the measurement was kept constant at 20° C. The viscosity was measured as a function of time. The measurement period was 300 s. Before the analysis, the samples were equilibrated at 20° C. for 1 h. The equipment was controlled by Texture Expert Exceed software, Version 2, 56 from stable Micro System.

In all experiments, the inulin used was Inulin LGI from Orafti [DP>8]; FOS was Beneo L95 (DP<10) from Orafti.

The results are summarised in the tables below.

TABLE 3

Effect of different sugars on the heat stability.

| Sugar type | Sugar concentration (wt %) | Appearance | Viscosity (mPa · s) |
|---|---|---|---|
| Lactose | 8 | Liquid | 7 |
| Glucose | 5-10 | Gel | |
| Saccharose | 8 | Liquid | 40 |
| Maltose | 8 | Weak gel | |
| FOS | 8 | Liquid | 11 |
| Inulin | 10 | Liquid | 10 |
| Polydextrose | 8 | Very viscous liquid | 90 |
| Galactose | 8 | Gel | |
| Sorbitol | 8 | Weak gel | |
| Fructose | 8 | Gel | |

Conditions: 10% (w/w) WPC 80 (equals 8% whey protein), 8% (w/w) sugar, pH 7.5, heating as described above. WPC 80 is Esprion 800 (DMV International, NL).

TABLE 4

Effect of sugar concentration and type
Different sugars were tested at different concentration.
Conditions: 10% (w/w) WPC 80 (=8% protein)
(Esprion 800), heating as described above.

| Sugar: concentration (w/w) | pH 7.5 Inulin | pH 7.5 FOS | pH 8.0 FOS | pH 7.0 Lactose | pH 7.0 Saccharose |
|---|---|---|---|---|---|
| 1% | Gel | Gel | n.t. | Gel | Gel |
| 2% | Gel | Gel | n.t. | Gel | Gel |
| 3% | Gel | Gel | n.t. | Gel | Gel |
| 4% | Gel | Gel | n.t. | Gel | Gel |

TABLE 4-continued

Effect of sugar concentration and type
Different sugars were tested at different concentration.
Conditions: 10% (w/w) WPC 80 (=8% protein)
(Esprion 800), heating as described above.

| Sugar: concentration (w/w) | pH 7.5 Inulin | pH 7.5 FOS | pH 8.0 FOS | pH 7.0 Lactose | pH 7.0 Saccharose |
|---|---|---|---|---|---|
| 5% | Gel | Gel | n.t. | Gel | Gel |
| 6% | n.t. | n.t. | Liquid (20 mPa·s) | Liquid | Liquid |
| 7% | n.t. | n.t. | Liquid (20 mPa·s) | Liquid | Liquid |
| 8% | Gel | Liquid | n.t. | Liquid | Liquid |
| 9% | Gel | Liquid | n.t. | Liquid | Liquid |
| 10% | Liquid | Liquid | n.t. | Liquid | Liquid | n.t. = not tested

TABLE 5

Effect of pH
8% (w/w) lactose

| Test nr. | pH | Result |
|---|---|---|
| 1 | 4.5 | Gelled |
| 2 | 5.0 | Gelled |
| 3 | 5.5 | Gelled |
| 4 | 6.0 | Gelled |
| 5 | 6.4 | Gel lumps |
| 6 | 6.5 | Gel lumps |
| 7 | 6.8 | Liquid |
| 8 | 7.0 | Liquid |
| 9 | 7.5 | Liquid |

Conditions: 10% (w/w) WPC 80 Esprion 800 (=8% protein), pH varied, 8% lactose, heating as described above.

TABLE 6

Effect of various whey proteins on heat stability of the beverage

|  | Results |
|---|---|
| WPC 80 Type 80, (Golden Cheese Company, US) | liquid |
| WPC 80 Oragel HG80 (Armor, FR) | liquid |
| WPC 30 Hiprotal 535 (DOMO, NL) | gelled |
| WPC 80 Esprion 800 (DMV International, NL) | liquid, viscous; (liquid at pH 8.0) |

Conditions: WPC % (w/w) 10%, FOS % (w/w) 8%, pH 7.5, heating as described above.

TABLE 7

Effect of adding Milk Protein Isolate (MPI) or Whey Protein Hydrolysate.

|  | 8 wt. % saccharose | | 4 wt % lactose + 4 wt % FOS |
|---|---|---|---|
| Esprion 800 (w/w)/pure whey protein | 6.9/5.5 | 6.2/5.0 | 7.5/6.0 | 6.8/5.5 |
| MPI %(w/w)/pure protein | 3.5/1.0 | — | 2.8/0.8 | — |
| Hydrolysate LE80GT | — | 4.2/3.2 | — | 4.5/3.5 |
| Total whey protein (wt. %) | 6.5 | 8.2 | 6.8 | 9.0 |
| Total protein (wt. %) | 8.7 | 8.2 | 8.5 | 9.0 |
| Appearance | Liquid | Liquid | Liquid | Liquid |
| Viscosity | 90 mPa·s | 50 mPa·s | 80 mPa·s | 25 mPa·s |

Conditions: pH 7.5, heating as above.

WPC 80 is Esprion 800; 80% protein on product, all whey protein;

MPI (MPI ReCaP, from DMV International, NL) is Milk Protein Isolate, 90% protein on product, of which 30% is whey protein.

LE80GT is a whey protein hydrolysate (79% whey protein on product) from DMV Internationals, NL. The degree of hydrolysis is 17%.

The invention claimed is:

1. A heat stable nutritional liquid having a pH of 6.6-8.2, and having a calcium content of less than 10 mM, an ionic strength of between 0.5 and 80 mM, comprising 5-12% w/w whey protein and 4-16% w/w of at least one sugar selected from di-, oligo- and poly-saccharides, wherein at least one monosaccharide residue is other than glucose.

2. The liquid according to claim 1, in which said sugar is selected from saccharides having the formula:

$$Gal_m\text{-}Glc_n\text{-}Fru_p$$

wherein Gal, Glc and Fru are galactose, glucose and fructose residues, respectively, which may have any relative position, and m=0-10, n=0 or 1, and p=0-200, provided that m+n+p=at least 2.

3. The liquid according to claim 2, in which the sugar is selected from saccharose, lactose, inulin and fructooligosaccharides.

4. The liquid according to claim 3, in which the fructooligosaccharides have a DP of 3-10.

5. The liquid according to claim 1, which has a pH of 6.8-8.0 and/or comprises 6-10% w/w whey protein and/or 6-15% w/w of said sugar.

6. The liquid according claim 1, in which the whey proteins are denatured following heat treatment at a temperature of at least 80° C.

7. The liquid according to claim 1, in which the whey protein comprises whey protein concentrate or whey protein isolate, or both.

8. The liquid according to claim 1, which contains 0.5-3% w/w of non-whey protein.

9. The liquid according to claim 8, in which the non-whey protein comprises casein.

10. The liquid according to claim 1, wherein the level of carbohydrates, other than said at least one sugar, is less than 3 wt. % of the beverage.

11. The liquid according to claim 1, provided in a container.

12. A process of preparing a heat stable, nutritional liquid having a calcium content of less than 10 mM, an ionic strength of between 0.5 and 80 mM, the method comprising the steps of:

a) providing a sugar solution;
b) adding whey protein to a final concentration of 5-12% w/w;
c) adjusting the pH to 6.6-8.2;

d) heating the liquid so obtained to a temperature of at least 80° C.;
e) cooling the liquid;
wherein the sugar solution comprises 4-16% w/w of at least one sugar selected from di-, oligo- and polysaccharides, wherein at least one monosaccharide residue is other than glucose.

13. The process according to claim 12, wherein the heat treatment comprises a UHT step or a batch heat treatment.

14. The process according to claim 13, wherein the UHT step comprises heating between 135° C.-150° C. for 2-35 seconds, and/or the batch heat treatment comprises heating at 80° C.-100° C. for 5-30 minutes.

15. The process according to claim 12, wherein the sugar is a fructan.

16. The process according to claim 12, wherein the whey protein comprises whey protein concentrate or whey protein isolate, or both.

17. A beverage obtained according to the method of claim 12.

18. The liquid according to claim 1 having a viscosity less than 50 mPa·s.

19. The process according to claim 12, wherein the liquid has a viscosity less than 50 mPa·s.

* * * * *